United States Patent [19]
Cockrell

[11] Patent Number: 5,326,203
[45] Date of Patent: Jul. 5, 1994

[54] STAKE POCKET ANCHOR

[76] Inventor: Johnnie D. Cockrell, P.O. Box 1352, Roseville, Calif. 95678

[21] Appl. No.: 915,303

[22] Filed: Jul. 20, 1992

[51] Int. Cl.⁵ .............................................. B62D 33/02
[52] U.S. Cl. .................................... 410/110; 410/106
[58] Field of Search ............... 410/101, 102, 106, 107, 410/108, 109, 110, 112, 113, 114, 115, 116; 248/499, 500, 503; 296/43, 167; 105/390

[56] References Cited

U.S. PATENT DOCUMENTS

| | | | |
|---|---|---|---|
| 3,259,353 | 7/1966 | Webb | 248/361 |
| 3,298,652 | 1/1967 | Burdick | 410/107 |
| 3,351,356 | 11/1967 | Clark et al. | 410/110 |
| 3,455,573 | 7/1969 | Magers | 280/179 |
| 3,595,125 | 7/1991 | Jacobs | 410/106 |
| 3,950,010 | 4/1976 | Robertson | 410/110 |
| 4,191,108 | 3/1980 | Jones | 410/110 |
| 4,219,229 | 8/1980 | Ciocan | 296/43 |
| 4,295,765 | 10/1981 | Burke | 410/110 |
| 4,607,991 | 8/1986 | Porter | 410/110 |
| 4,657,299 | 4/1987 | Mahan | 296/159 |
| 4,672,909 | 6/1987 | Sweetsir | 410/107 |
| 4,762,449 | 8/1988 | St. Pierre et al. | 410/107 |
| 4,812,093 | 3/1989 | Millar | 410/110 |
| 4,948,311 | 8/1990 | St. Pierre et al. | 410/107 |
| 4,958,875 | 9/1990 | Zamzow | 410/110 |
| 4,993,343 | 2/1991 | Czipri | 410/112 |
| 5,141,277 | 8/1992 | Alexander | 410/101 |

Primary Examiner—Mark T. Le
Attorney, Agent, or Firm—Bernhard Kreten

[57] ABSTRACT

A stake pocket anchor adapted to fill an upper area of a stake pocket hole conventionally found on pickup truck utility beds passing through horizontal portions of the pickup truck fender. An anchor plate is placed within the stake pocket hole of the pickup truck and a locator plate cooperates therewith to sandwich therebetween adjacent a downwardly depending lip integrally formed in the truck fender. A central portion of both the locator plate and anchor plate cooperate with various instrumentalities by threaded engagement therewith to serve multiple needs in a pickup truck environment. For example, an eyebolt can be passed through and threaded into the stake pocket anchor.

21 Claims, 6 Drawing Sheets

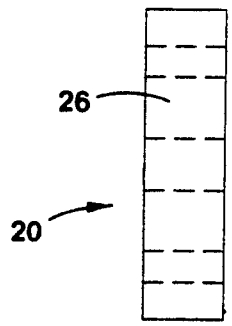
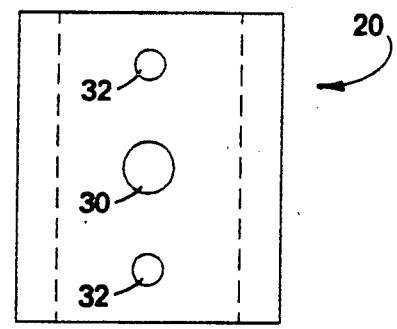
FIG. 5  FIG. 4
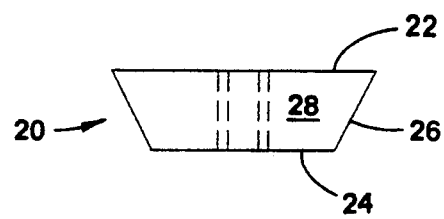
FIG. 6
FIG. 8
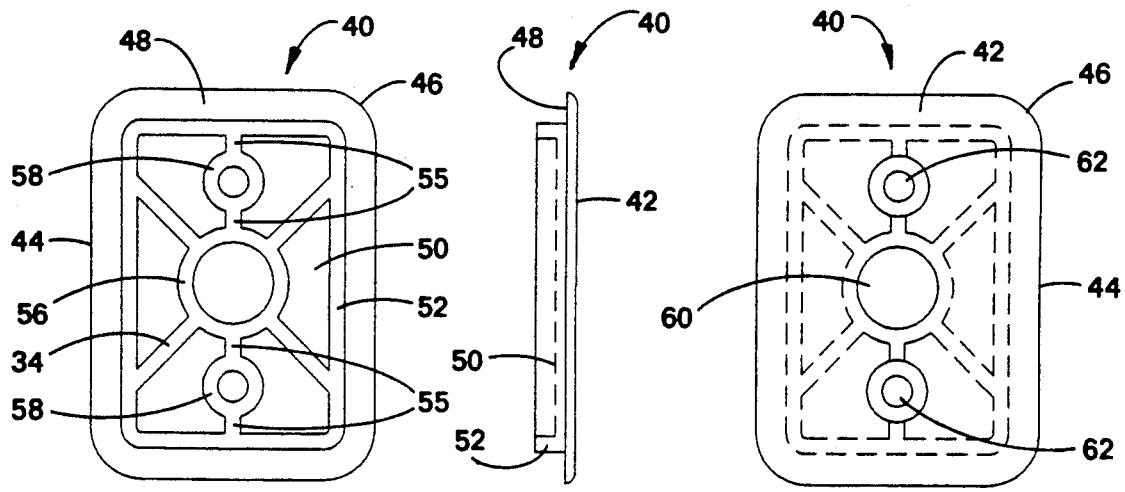
FIG. 7  FIG. 9  FIG. 10

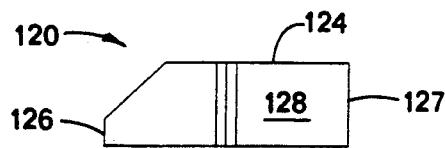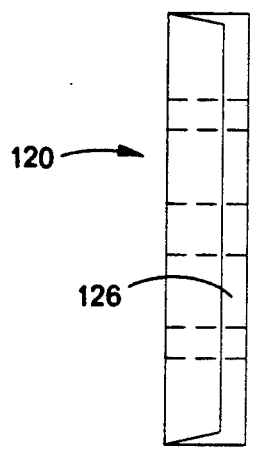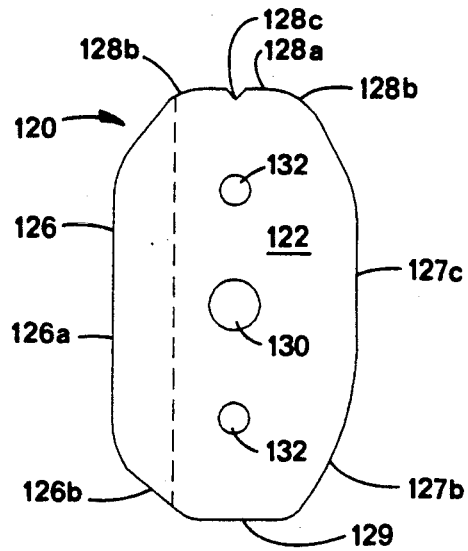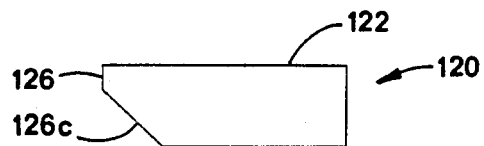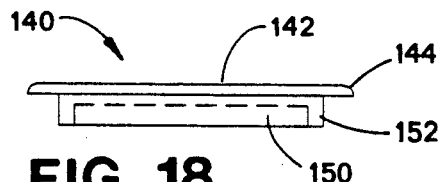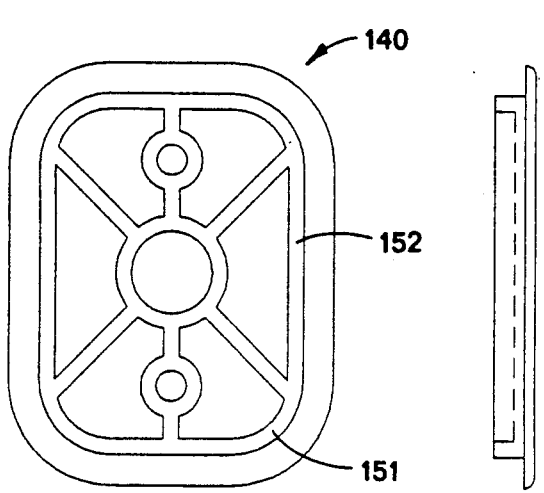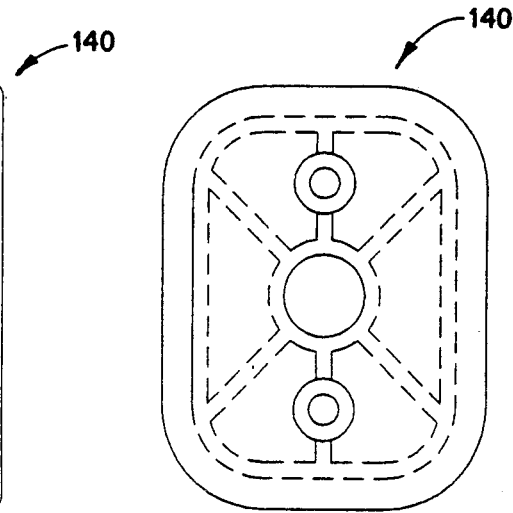

STAKE POCKET ANCHOR

FIELD OF THE INVENTION

The following invention relates generally to instrumentalities which are secured to stake holes disposed within sidewalls in the cargo area of a vehicle, typically a pickup truck. More specifically, the device includes first and second plates which sandwich an opening formed adjacent distressed portions of a top surface of a pickup truck sidewall. The device supports any of a variety of upwardly extending projections useful in securing different types of articles on the bed of the pickup truck.

BACKGROUND OF THE INVENTION

Many manufacturers of vehicles such as pickup trucks provide a plurality of holes on a top surface of the fender portion adjacent the pickup bed. These so called "stake holes" were presumably initially intended for the vertical placement of stakes therewithin to allow a load to be transported in the pickup truck which extends up over the top surface of the vehicle bed. In addition, the stake holes (also called stake pockets) have been used as an area which can receive rope for lashing down cargo contained on the pickup bed.

While these stake holes are perfectly adequate for supporting stakes in the manner envisioned, various other needs sometimes arise for which the stake holes give less than totally adequate response. For example, it is sometimes desirable to support a camper shell over the pickup bed. In this situation, the stake holes are less than satisfactory.

Another scenario engendering dissatisfaction includes the necessity for having to tie down a load of cargo on the pickup bed. Since stakes are traditionally monolithic, provision must be made therewithin to allow cordage to be threaded therethrough, such as by inserting an eye bolt into the stake to allow the facile deployment of a cordage therethrough. Nonetheless, stakes are still susceptible to removal by vertical translation.

The following prior art reflects the state of the art of which applicant is aware insofar as these patents appeared germane to the process at hand. It is respectfully submitted, however, that none of these patents, when considered singly or when combined in any conceivable permissible manner teach the nexus of the instant invention as set forth hereinafter.

| INVENTOR | U.S. PAT. NO. | ISSUE DATE |
| --- | --- | --- |
| Webb | 3,259,353 | July 5, 1966 |
| Magers | 3,455,573 | July 15, 1969 |
| Jones | 4,191,108 | March 4, 1980 |
| Ciocan | 4,219,229 | August 26, 1980 |
| Porter | 4,607,991 | August 26, 1986 |
| Mahan | 4,657,299 | April 14, 1987 |
| Millar, Jr. | 4,812,093 | March 14, 1989 |
| St. Pierre, et al. | 4,948,311 | August 14, 1990 |

These Patents can be categorized by certain characteristics: For example, the patents to Porter, Webb, Jones and Mahan all appear to provide similar devices in that they rely upon spring tension in order to retain some form of anchor in the stake pocket. Stated alternatively, a member is placed within the pocket in a compressed configuration which, once received within the pocket is allowed to expand and provide an impediment for removal from the pocket by expansion of a resilient member. While these devices intuitively appear to provide a reliable device for achieving similar purposes as the instant invention, certain inefficiencies may attend these devices either immediately upon installation or as a function of time.

For one thing, not all these devices appear to lend themselves to ready disassociation from the vehicle fender so that they can be substituted with another type of device should the need arise. In addition, some of these devices may degrade as a function of time and temperature or by the contact with corrosives so that their reliability may be compromised. Because of the nature of the stake pocket, failure of a device within a stake pocket either makes extraction difficult or alternatively would provide a rattling in the space between the inner and outer walls.

Millar teaches the use of a tie-down anchor which necessarily entails penetrating the wall of the vehicle fender. Besides providing an outwardly extending projection, many vehicle owners would find it objectionable to penetrate the exterior wall of their vehicle.

The patent to Magers provides a tie-down unit in which a tie-down member (42, 82) serves as an outrigger extending beyond the nominal width of the vehicle and is subjected to forces that provide a camming action which increases the ability of the tie-down unit to remain attached to the vehicle. Apart from the obvious objectionable characteristics that attend an outward projection which provides a wider vehicle, the camming action may provide flexing which engenders metal fatigue as a function of time.

The patent to St. Pierre, et al. teaches the use of tie-down fitting having a lower plate dimensioned for insertion through the stake hole and addressable with an underside of the horizontal wall defining a portion of a fender adjacent the pickup truck area. An upper plate of the fitting engages an upperside of the fender horizontal wall and is secured to the lower plate. The upper and lower plates are united with two screws. In one embodiment, a pivotal member hingedly supported on the upper plate rotates from a stored to a deployed position. In this version, therefore, all loads are transferred through the pivot pin and its support structure. In some instances, this structure may be subjected to loads at a less than optimum angle making this type of arrangement somewhat more susceptible to failure than the structure according to the instant invention. Another variant shown in St. Pierre involves the use of a "J" hook adapted to fish the first embodiment from its recessed position when deployed with a camper.

Another embodiment in St. Pierre provides a solitary threaded stud member which both unites the upper and lower plates and simultaneously serves as a support post upon which an eye member is threadedly supported that fixes the camper shell in place. The upper and lower plates associated therewith are interconnected only by the one stud.

The remaining citation shows the state of the art further.

SUMMARY OF THE INVENTION

The instant invention is distinguished over the known prior art in a multiplicity of ways. Viewed in its most elemental form, the instant invention is tailored to and takes advantage of the peculiarities inherent in the different fender styles associated with the two types of vehicles to which the two variants of the instant invention are directed.

Stated alternatively, one variant according to the instant invention is tailored to certain stake pockets which have longitudinal rolled edges formed in the fabrication of the stake holes and is manufactured by Ford Motor Company.

Another variant is one which takes advantage of structural anomalies inherent in pickup trucks manufactured predominantly by General Motors Corporation and involves anchoring details with downwardly turned flared lips along latitudinal stake pocket edges.

The net effect of having this structure closely conform to the stylistic peculiarities of these types of vehicles is to provide a device which more securely adheres to the stake pocket than prior art devices would indicate and to more reliably remain affixed thereto in the event of unexpected load shifts or sudden impulses transmitted thereto which are foreseeable consequences of taking such a vehicle in transit.

By having the clamping feature that fits within the stake pocket closely tailored to the design specifics of the pocket, an interfit between the pocket and the device will have been effected which provides superior long term results than when considering alternative systems.

It is postulated that the quality of the interfit between the stake pocket and the anchor associated with the stake pocket directly affects the ability for the device to optimally achieve its avowed purpose. The greater precision with which the stake pocket and anchor interconnect directly relates to the ability to carry loads.

OBJECTS OF THE INVENTION

Accordingly, it is a primary object of the present invention to provide a novel and useful stake pocket anchor according to the present invention.

A further object of the present invention is to provide a device as characterized above which lends itself to mass production techniques.

A further object of the present invention is to provide a device as characterized above which is extremely durable in construction, safe to use and lends itself to retrofitting on many commercially available vehicles.

A further object of the present invention is to provide a device as characterized above which in its essence is formed from two interconnected components which sandwich a portion of a conventional fender on a pickup truck or the like and means to couple various other instrumentalities thereto.

Viewed from a first vantage point it is an object of the present invention to provide a stake pocket anchor which includes a lower anchor plate, an upper locator plate and means for wedging the locator plate to the anchor plate to hold same in fixed relation with respect to a stake pocket within which it is oriented to reside, and means for operatively coupling the pocket anchor to other instrumentalities including means extending from the anchor plate and projecting above the locator plate.

Viewed from a second vantage point it is a further object to provide a stake pocket anchor having a lower anchor plate provided with a contour complemental to a bottom surface of a vehicle fender lower horizontal wall and a substantially rigid locator plate adapted to reside within a stake pocket on a top surface of the vehicle fender horizontal wall with means interconnecting the locator plate and the anchor plate to preclude the unwanted migration of the locator plate with respect to both the anchor plate and the vehicle fender and means for attaching other instrumentalities to the anchor plate.

Viewed from a third vantage point, it is an object of the present invention to provide a method for increasing the reliability of instrumentalities for holding down articles in vehicles, such as a pickup truck, the steps including interconnecting an anchor plate which is adapted to reside within a stake pocket to a locator plate which is adapted to reside on top of a stake pocket, maintaining clearance between the anchor plate and the locator plate such that the anchor plate can be oriented to slide within the stake pocket, and then drawing together the anchor plate with the locator plate to provide firm interconnection by wedging the anchor plate and the locator plate in the pocket and attaching a fastener to the anchor plate to coact with articles to be held down.

These and other objects will be made manifest when considering the following detailed specification when taken in conjunction with the appended drawing figures.

BRIEF DESCRIPTION OF THE DRAWINGS

FIG. 4 is a top plan view of a lower anchor plate shown at the bottom of FIG. 3.

FIG. 5 is a side view of FIG. 4.

FIG. 6 is an end view of FIGS. 4 and 5.

FIG. 7 is a bottom plan view of an upper portion of FIG. 3, showing a locator plate.

FIG. 8 is an end view of FIG. 7.

FIG. 9 is a side view of FIG. 7.

FIG. 10 is a top plan view of FIG. 7.

FIG. 13 is a top plan view of the lower plate shown in FIG. 12.

FIG. 14 is one end view of FIG. 13.

FIG. 15 is another end view of FIG. 13.

FIG. 16 is a side view of FIG. 13.

FIG. 17 is a bottom plan view of another portion of FIG. 12.

FIG. 18 is an end view of FIG. 17.

FIG. 19 is a side view of FIG. 17.

FIG. 20 is a top view of FIG. 17.

DESCRIPTION OF PREFERRED EMBODIMENTS

Figure 1:
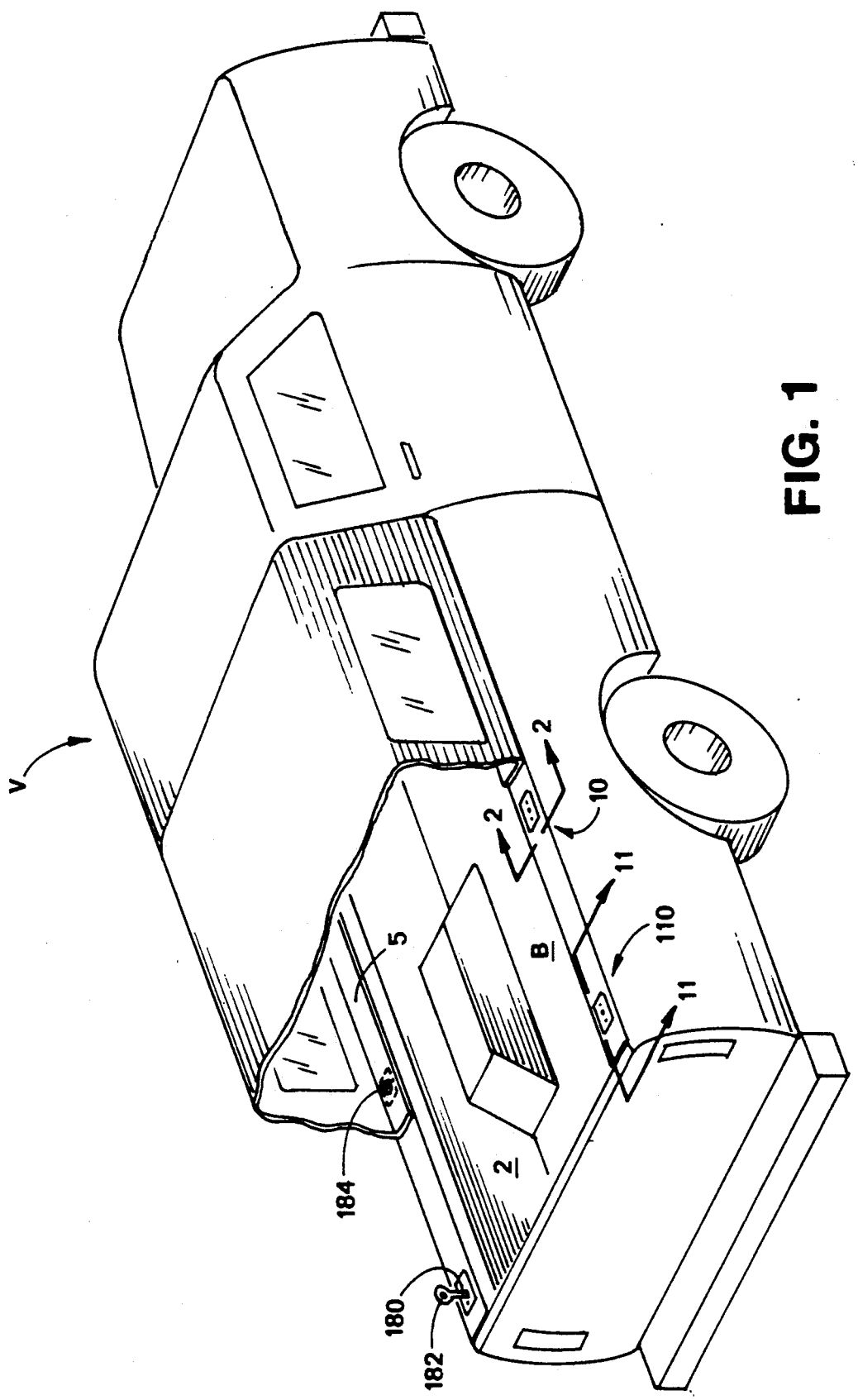
FIG. 1 is a perspective view of the invention in its intended environment, artistic license having been taken to show a multiplicity of deployments.

Considering the drawings, wherein like reference numerals denote like parts throughout the various drawing figures, reference numeral 10 is directed to a stake pocket anchor according to one form of the invention and shown in FIGS. 1 through 10. The stake pocket anchor according to another form of the invention bears reference numeral 100 and predominantly occupies the remaining drawing figures.

In its essence, both versions rely on an anchor plate located within the stake pocket well which is attached to a locator plate on an outside of the stake pocket hole and in overlying registry with the hole. First and second machine screws unite the anchor and locator plates to firmly fix these plates within the stake pocket hole. A central bore passing through the locator plate and in threaded communication with the anchor plate allows various instrumentalities to extend from a top surface of the fender of a vehicle for the multiple cargo carrying purposes to be illustrated briefly hereinafter.

More specifically, and with reference to drawing FIGS. 1 through 10, one form of stake pocket anchor 10, configured specifically to be accommodated by General Motors Corporation vehicles such as Chevrolet pickup trucks is shown. Thus, the vehicle V has a bed B circumscribed on two sides by sidewalls 2. In addition, an exterior sidewall 4 (FIG. 2) is provided spaced from and substantially parallel to the interior sidewall 2. The interior and exterior sidewalls 2, 4 are interconnected with a top wall 6 which is substantially horizontal. The intersection 8 between the interior side wall 2 and the top horizontal wall 6 is shown to be a sharp 90 degree angle. The top horizontal wall 6 communicates with the exterior side wall 4 by a radiused transition 12 preferably of constant radius with respect to a center (not shown).

The stake pocket anchor 10 is placed substantially medially along the top horizontal wall 6 and into an anchor pocket opening. The anchor 10 relies upon the distressed metal portions integrally formed adjacent the openings in the top horizontal wall 6 to attach to the vehicle V. More specifically, to preform the stake pocket opening in most vehicles V, the top horizontal wall 6 is worked such that downwardly depending lips 14, 16 are formed running parallel to the interior and exterior side walls 2, 4. The lip 14 closest to the interior side wall 2 and the lip 16 closest to the exterior side wall 4 may preferably span the entire length of the anchor pocket opening.

The stake pocket anchor 10 according to the instant invention takes advantage of the presence of these two lips, 14, 16 running parallel to the interior and exterior side walls 24 by providing an anchor plate 20 which passes into a hole H formed in the fender of the vehicle V by the stake pocket opening. The anchor plate 20 has a width which is greater than the distance between lip 14 and 16 so that it can be drawn up against and supported by each lip 14, 16 contacting a top surface 22 of the anchor plate 20.

The anchor plate 20 is held in fixed position by means of a locator plate 40 which attaches to the anchor plate 20 and remains on an outside surface of the top horizontal wall 6. The locator plate 40 has a lip 52 of complemental depth to the lips 14, 16 formed on the pickup bed B and includes a shelf 48 which circumscribes the lips 52 so that the locator plate 40 can rest over the stake pocket opening with the lip 52 of the locator plate 40 depending therewithin and adapted to contact a top surface 22 of the anchor plate 20. First and second machine screws 70 draw the locator and anchor plates 20, 40 together for firm retention.

More particularly, FIGS. 4 through 6 reflect that the anchor plate 20 is in essence a truncated quadrilateral pyramid where the truncation occurs parallel to the top wall 22 so that a top wall 22 and a bottom wall 24 are placed in spaced parallel configuration. Four walls extend between the top and bottom surfaces. Two rectangular side walls 26 extend between the top and bottom surfaces. Two end walls 28 finish the thus-formed geometrical solid. The end walls 28 are in the form of isosceles trapezoids and the side wall 26 are rectangular constructs. As shown in FIG. 6, the top wall 22 has a width greater than the bottom wall 24.

Figure 2:
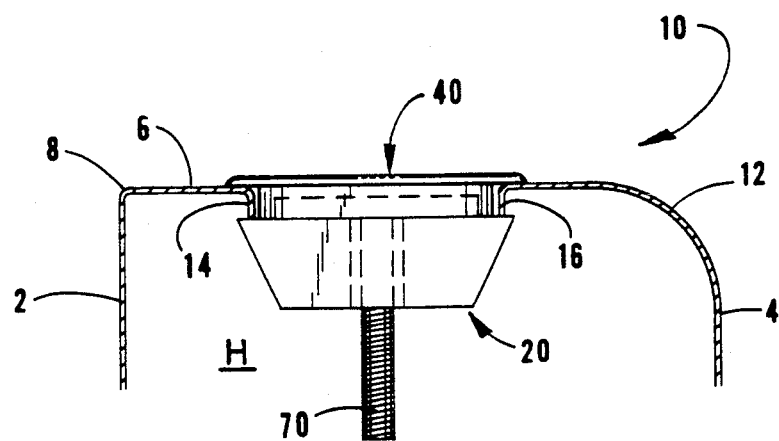
FIG. 2 is a sectional view taken along lines 2—2 of FIG. 1.

With reference to FIG. 2, it can be perceived that the top wall 22 is dimensioned to abut against the lips 14, 16 after the anchor plate 20 has been placed within the stake pocket hole H. In addition, the anchor plate 20 includes outer bores 32 that extend from the top surface 22 through to the bottom surface 24. These outer bores 32 are spaced equally from a geometrical center of the anchor plate 20. At the geometrical center, a center bore 30 is provided. The bores 30, 32 all have threads disposed on an interior thereof. The outer bores 32 have threads complemental to the pitch of the threads of machine screws 70 in a manner to be discussed.

Figure 3:
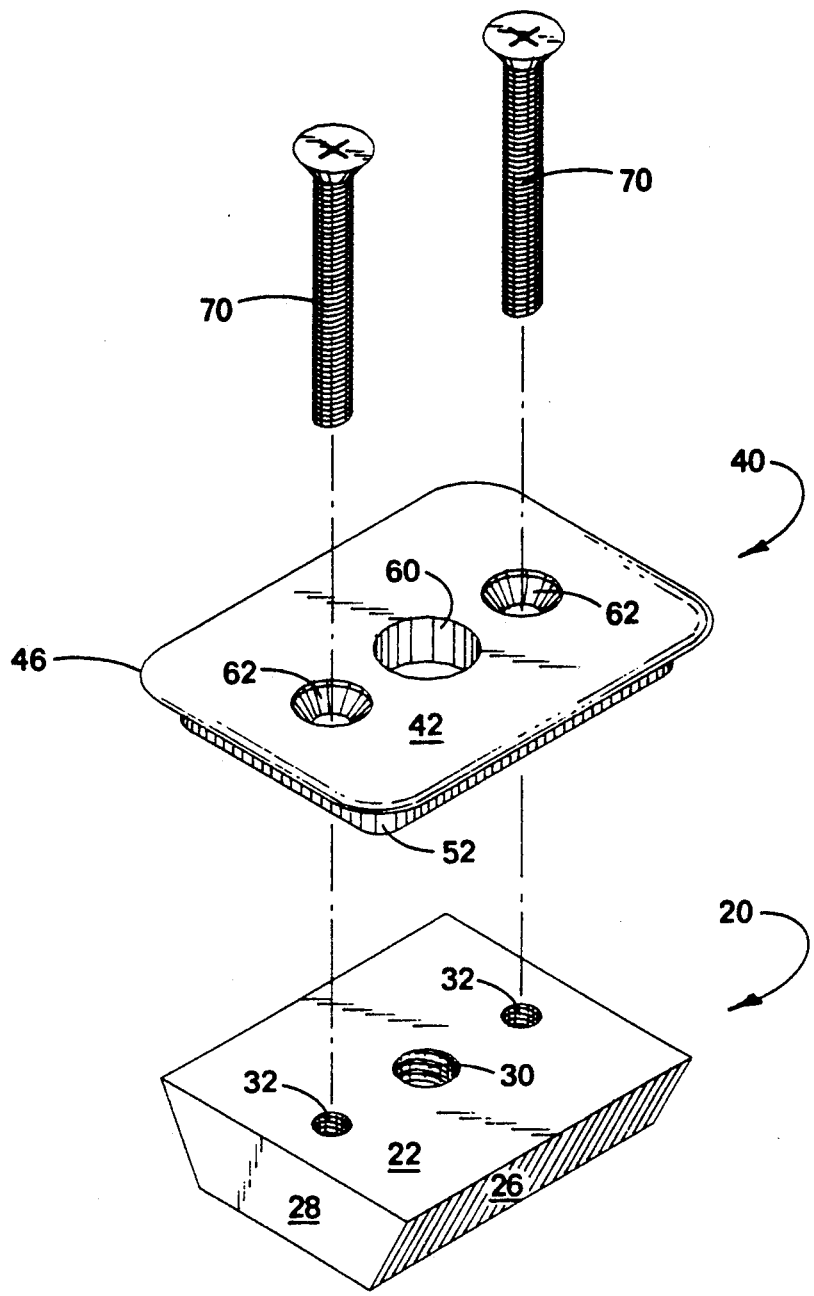
FIG. 3 is an exploded parts view in perspective of that which is shown in FIG. 2.
Figure 12:
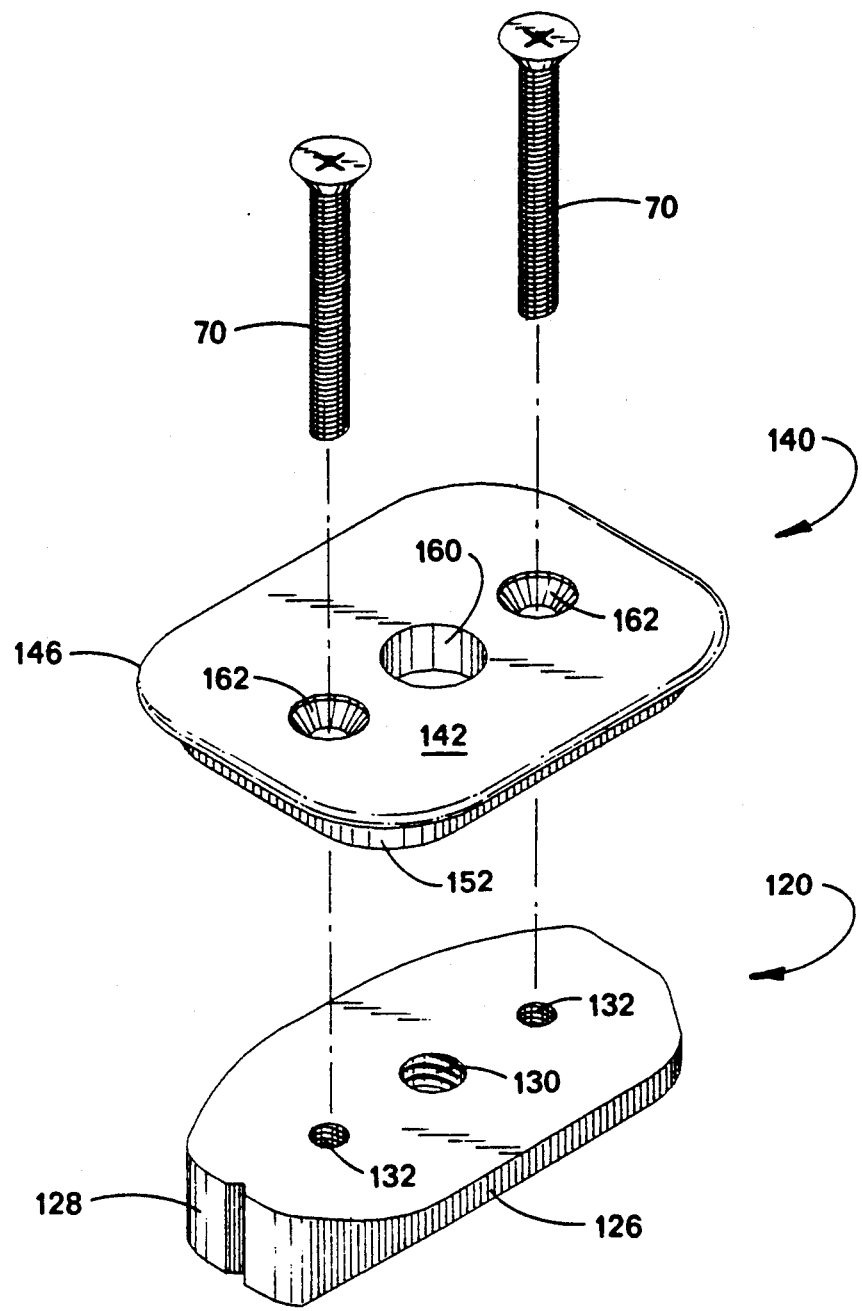
FIG. 12 is a perspective view of that which own in FIG. 11, with parts separated and exploded for greater detail.

Attention is specifically directed to FIGS. 7 through 10 which recite detail of the locator plate 40 shown in FIG. 3. More particularly, the locator plate 40 includes a top surface 42 having a substantially rectangular configuration. The outer periphery 44 of the top surface 42 includes feathered edges or a taper allowing a smooth transition with the top exterior surface of the horizontal wall 6 of the pickup truck. In addition, the top surface 42 of the locator plate 40 includes radiused corners 46 so that there are no sharp exterior projections. An underside of the top surface 42 reveals a shelf 48 extending inwardly and peripherally. The shelf 48 rests on horizontal wall 6. The shelf 48 is interrupted by a downwardly depending lip 52 of substantially rectangular configuration. As mentioned infra, the lip 52 has a dimension complemental to that of the lips 14, 16 on the pickup bed B. A major underside 50 of the locator plate 40 is parallel to the top surface 42 and extends within the borders defined by the lip 52.

The locator plate 40 includes a pair of outer bores 62 passing through the top surface 42 and bottom surface 50. These bores 62 are reinforced by means of a complementally formed outer boss 58. In addition, a central bore 60 is provided at the geometric center of the locator plate 40 passes through the top surface 42 and bottom surface 50. The central bore 60 similarly is circumscribed by a boss 56. These bores 60, 62 correspond in location to the placement of the threaded bores 30, 32 in the anchor plate 20. Thus, the outer bores 62 of locator plate 40 can match with the outer bores 32 of anchor plate 20. The central bore 60 matches with the center bore 30 between the locator plate 40 and the anchor plate 20 respectively.

The bosses 56, 58 are located on the bottom side of locator plate 40 and are attached to the peripheral lip 52 by means of a rib network 34. As shown, four ribs 34 extend from the center boss 56 in an X-pattern and intersect longitudinal portions of the lip 52 intermediate corners thereof. In addition, one additional rib 55 extends between the outer bosses 58 and the central boss 56 and the latitudinal portions of the lip 52. These ribs 34, 55 and bosses 56, 58 are one logical result from having formed the locator plate 120 using an injection molding process. Typically, an injection molding process tends to reward designs which promulgate uniform wall thickness in the injection molding process so as to minimize cycle time and to decrease the likelihood that parts will be ejected from the mold cavity before having been properly cured. An ancillary benefit of the rib structure is the provision of additional structural rigidity at a modest increase in both weight and use of material.

With respect to the second embodiment shown generally in FIGS. 11 through 20, a device is shown tailored for ready deployment on another type of pickup truck, such as ones manufactured by Ford Motor Company. Thus, the section along lines 11—11 of FIG. 1 reflect a significant detail with respect to the peculiarities of a Ford pickup truck fender wall construction. Briefly, one difference between the General Motors and Ford trucks involves the placement of the dependent lips, and is evident when comparing FIGS. 2 and 11.

Figure 11:
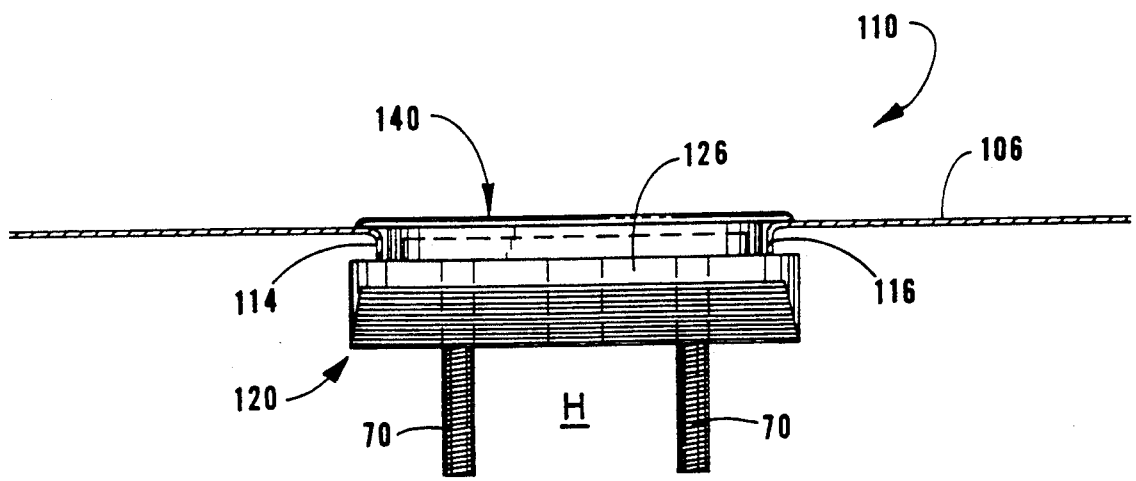
FIG. 11 is a sectional view taken along line 11—11 of FIG. 1.

With respect to FIG. 11, the Ford version shows that the lips 114 and 116 depend downwardly from the horizontal top wall 106 of the pickup truck fender such that the lips 114, 116 are transverse to the long axis of the vehicle. Thus, an appropriate anchor plate 120 in conjunction with an appropriate locator plate 140 needs to be tailored to sandwich the latitudinal lips 114, 116 that are available on this type of truck. Recall the first embodiment used lips 14, 16 which were parallel to the vehicle's long axis.

Considering FIGS. 13 through 16, the modified anchor plate 120 shows the salient differences between this construction and the anchor plate 20 for the GMC version. More specifically, the anchor plate 120 includes a top surface 122 and a bottom surface 124, a first end wall 128 and a second opposite end wall 129 and side walls 126 and 127. Collectively this anchor plate 120 is a mechanism which serves a function similar to the first embodiment but has a more complex contour as will be described.

The top surface 122 is substantially planar. One side wall 126 includes an upper linear edge 126a and a tapered portion 126b at outboard extremities thereof. The area below both the linear section 126a and the taper 126b is provided with a chamfer 126c so that the top surface 122 has a greater expanse than the bottom surface 124. An opposite side wall 127 includes a central linear portion 127c which is somewhat parallel to the linear portion 126a on the opposite side, and includes a similar slope 127b at lateral extremities thereof as it transitions to the end walls 128 and 129. However, the slope 127b begins an earlier and more gentle transition closer to a central portion of the linear side wall 127a than does its counterpart on the opposite side. FIGS. 13 and 14 show details of one end wall 128. As shown, the end wall 128 includes a major portion 128a which is substantially linear and communicates with both side walls 126, 127 by means of a radius 128b. A v-shaped notch 128c is substantially centrally disposed on the end face. The notch 128c is utilized to direct the user as to how to orient the anchor plate 120. Preferrably the notch 128c is always oriented toward a forward end of the vehicle v.

An opposite end wall 129 is substantially linear and interconnects the taper portion 126b (in conjunction with the chamfer 126c ) and the slope side wall 127b . The orientation of this anchor plate 120 with respect to the vehicle as in FIG. 11 makes it evident that the anchor plate 120 purchases against the lips 114, 116 adjacent the end walls 127, 128 of this device whereas in the first embodiment the area of engagement was adjacent the side walls.

Attention is directed to FIGS. 17 through 20 which reflect certain details of the locator plate 140. The most salient difference between the first version of the locator plate and this current version of the locator plate 140 occurs where the lip 152 transitions from its longitudinal aspect to its latitudinal aspect. As shown in the drawings, the area transition has a softer radius of curvature 151 than is shown in the first version of FIG. 7. In most other respects, the structure is similar and bears similar reference numerals except with the addition of the numeral 100 to indicate the second embodiment.

In use and operation, the following methodology yields satisfactory results: initially, the anchor plate 20, 120 and locator plate 40, 140 are interconnected by means of the two machine screws 70 which pass through the locator plate 40, 140 and threadedly engage the anchor plate 20, 120 as described hereinabove. However, the two plates are held in spaced relation somewhat at extremities of the length of the machine screws 70 so that the maximum clearance afforded by the screw's lengths exists between the two plates. The anchor plate 20, 120 is oriented into the stake pocket hole H perhaps by orienting the anchor plate 20, 120 along a diagonal to pass through the stake pocket hole H. Because the machine screws 70 have been fully deployed between the locator plate 40, 140 and the anchor plate 20, 120 orienting the anchor plate 20, 120 though the hole H along its diagonal is possible. Thereafter, the anchor plate 20, 120 is brought up against the bottom edges of the lips 14, 16, 114, 116 shown in FIGS. 2 and 11 so that when the machine screws 70 advance downwardly and pass into the stake pocket hole H the peripheral lip 52, 152 nests within the opening provided by the lips 14, 16, 114, 116. Notice that the anchor plate 20, 120 and locator plate 40, 140 have substantially the same width and length and that these plates are oriented so that edges are substantially parallel to one another. Stated alternatively the locator plate 40, 140 and anchor plate 40, 140 have substantially the same dimensions parallel to each other and located in different horizontal planes and not transverse one with respect to the other.

Once the machine screws 70 have been tightened to sandwich the anchor plate 20, 120 up against a bottom edge of the truck lip 14, 16 or 114, 116 and the locator plate 40, 140 is substantially flush on a top exterior surface of the top horizontal wall 6, 106, by having the lip 52, 152 nest within the top portion of the well defined by the lips 14, 16, 114, 116, this device 10, 110 is capable of supporting other structure thereupon.

As shown in FIG. 1, for example, an eyebolt having a threaded stem 180 has a pitch complemental to the dimension of the threaded central bore 30, 130 so that the eyebolt stem 180 can be secured to the anchor plate 20, 120. Thus, the eyelet 182 of the eyebolt is upwardly projecting and adapted to receive appropriate instrumentalities for facilitating the transport of cargo on the bed B.

FIG. 1 also reflects the provision of a bolt 184 which passes through a sill 5 formed on most camper shells so that the sill 5 and therefore the camper is firmly secured to the pickup truck by the bolt 184 being threadedly engaged with either the threaded bore 30 or 130. In view of the foregoing, it should now be evident that other utilizations of this device could be possible. For example, whereas traditional stake pocket holes were adapted to receive a stake, a situation may arise where the anchor plate 20, 120 and locator plate 40, 140 are already deployed on the vehicle V and a need for having the stake pocket holes revert to their original use is contemplated. In other words, the stake pocket is needed for placement of a stake therewithin. In such an event, elements which simulate a stake may be provided. A central bore is provided in a stake through which a bolt 184 is adapted to pass so that a "modified stake" can be attached to the stake pocket anchor 10, 110 with an elongated bolt 184 connecting with the threaded bore 30, 130.

Moreover, having thus described the invention, it should be apparent that numerous structural modifications and adaptations may be resorted to without departing from the scope and fair meaning of the instant invention as set forth hereinabove and as described hereinbelow by the claims. For example, the device delineated hereinabove can be used to support a lumber rack.

I claim:

1. A stack pocket anchor mounted at a stake pocket, comprising:
    a lower anchor plate placed within a hollow space of the stake pocket;
    an upper locator plate placed over the hollow space of the stake pocket, and having a lower portion extending into the hollow space;
    means for pinching said locator plate to said anchor plate to hold said locator plate and said anchor plate in a fixed relation with respect to the stake pocket, and
    means for operatively coupling said pocket anchor to other instrumentalities, said means for operatively coupling including, with said upper and lower plates in their respective assembled positions, a temporarily unoccupied hole, said hole removably receiving means extending from said anchor plate and projecting above said locator plate.

2. The pocket anchor of claim 1 wherein said locator plate has a lip on a lower surface thereof which conforms to edges of the stake pocket, whereby horizontal translation of said pocket anchor with respect to the stake pocket is precluded.

3. The pocket anchor of claim 2 wherein said locator plate has a contour on extreme edges thereof which includes a shelf of greater peripheral area than the peripheral area of the stake pocket, whereby vertical downward translation of said pocket anchor with respect to the stake pocket is precluded.

4. The pocket anchor of claim 3 wherein said pinching means includes two bolts vertically threaded through said locator plate and said anchor plate, said bolts positioned distant from said temporarily unoccupied hole, and wherein said anchor plate has a peripheral area greater than a peripheral area of the stake pocket, whereby said locator plate and said anchor plate may be tightened together and securely fastened to the stake pocket through rotation of said bolts.

5. The pocket anchor of claim 4 wherein said means for operatively coupling said pocket anchor to other instrumentalities includes a threaded hole located in said anchor plate below a central bore in said locator plate.

6. The pocket anchor of claim 5 wherein said locator plate and said anchor plate contact each other within the stake pocket and along edges of the stake pocket when said bolts are sufficiently tightened, whereby said pocket anchor becomes a rigidly coupled assembly securely fastened at the stake pocket which exhibits high resistance to various physical loads.

7. The pocket anchor of claim 6 wherein said locator plate includes rib means on an underside thereof, whereby additional rigidity and structural strength are provided.

8. The pocket anchor of claim 7 wherein said rib means includes boss means surrounding a plurality of outer bolt receiving bores and said central bore, whereby strength of said pocket anchor is increased.

9. A stack pocket anchor comprising in combination:
    a lower anchor plate provided with a contour complemental to a bottom surface of a vehicle fender lower horizontal wall,
    a substantially rigid locator plate adapted to reside within an opening of a stake pocket on a top surface of the vehicle fender horizontal wall with means for interconnecting the locator plate and the anchor plate to preclude unwanted migration of the locator plate with respect to both the anchor plate and the vehicle fender, and
    means for attaching other instrumentalities to the anchor plate, said means for attaching including a temporarily unoccupied hole in the anchor plate configured to receive any complementally threaded instrumentality.

10. The pocket anchor of claim 9 wherein said locator plate has a peripheral shelf extending horizontally from said locator plate adapted to reside on a top surface of the vehicle fender adjacent said stake pocket, whereby vertical motion of said pocket anchor with respect to the fender is precluded.

11. The pocket anchor of claim 10 wherein said locator plate has a peripheral downwardly extending lip shaped to conform to a peripheral contour of the stake pocket said lip having a length similar to a length of a lip of the peripheral contour of the stake pocket, whereby lateral translation of the pocket anchor with respect to the vehicle fender is precluded.

12. The pocket anchor of claim 11 wherein said interconnecting means includes two or more bolts receivable within threaded holes in said anchor plate and outer bores in said locator plate orientable directly above said threaded holes, whereby rotation of said two or more bolts causes said locator plate and said anchor plate to migrate towards each other entrapping the lip of the peripheral contour of the stake pocket therebetween 13. The pocket anchor of claim 12 wherein said temporary unoccupied hole is a vacant threaded hole in said anchor plate, said vacant threaded hole having a depth and diameter sufficient to securely support various instrumentalities thereto.

14. The pocket anchor of claim 13 wherein said locator plate and said anchor plate impact each other and said anchor plate impacts said lip of the peripheral contour without substantially compressing the lip upon tightening of said two or more bolts, whereby said pocket anchor is strengthened to resist bending loads experienced by said anchor plate.

15. A method for securely connecting to a vehicle instrumentalities for holding down articles in vehicles, the steps including:
    interconnecting an anchor plate which is adapted to reside under a stake pocket opening to a locator plate which is adapted to reside on top of a stake pocket;
    configuring the locator plate to include a downwardly extending lip which resides adjacent walls of the stake pocket for preventing the locator plate from moving horizontally;
    maintaining clearance between the anchor plate and the locator plate such that the anchor plate and the locator plate can be oriented to slide relative to the stake pocket;
    drawing together the anchor plate to the locator plate to provide firm interconnection by pinching the anchor plate and locator plate together on opposite sides of a lip defining a periphery of pocket; and, attaching a fastener to one of the plates to coact with articles to be held down.

16. The method of claim 15 including the step of configuring the locator plate to include a horizontally extending shelf which extends beyond said walls of the stake pocket, and which supports the locator plate on the vehicle, at a location surrounding the stake pocket.

17. The method of claim 16 wherein said drawing together step includes rotating two or ore bolts, threaded to the anchor plate and passing through the locator plate, until the anchor plate and the locator plate impact edges of the stake pocket, said two or more bolts threaded into holes, in the anchor plate, distinct from a fastener attaching hole, the fastener attaching hole remaining vacant until said fastener is threaded into the fastener attaching hole.

18. The method of claim 17 wherein said attaching step includes rotating the fastener into the complementally threaded fastener attaching hole located in the anchor plate.

19. The method of claim 18 including the step of configuring the locator plate and the anchor plate to impact each other upon tightening of the two or more bolts, whereby further reliability of attachment is obtained through stabilization inherent in collapsing the anchor plate and the locator plate together within the stake pocket.

20. In a stake pocket associated with a cargo carrying area of a vehicle, the pocket including a peripheral edge with a lip extending downwardly therefrom, a stake pocket anchor comprising in combination:

an anchor plate oriented to abut against the lip, a locator plate including a peripheral shelf resting on the peripheral edge, said locator plate including a lip depending from said shelf and extending into the pocket and preventing lateral migration of said locator plate relative to the pocket, means for pinching said anchor plate to said locator plate, and means for adhering structures above the stake pocket, said adhering means independent of said pinching means.

21. The device of claim 20 wherein said pinching means is said depending lip of said locator plate extending away from said shelf a distance similar to a length of the lip of the stake pocket, and means to drawn said anchor plate toward said locator plate.

* * * * *